April 24, 1956  J. P. KOVACS  2,743,019
MULTIPLE STAGE FILTER
Filed Aug. 28, 1953  3 Sheets-Sheet 1

INVENTOR.
Julius P. Kovacs
BY
Kenyon & Kenyon
ATTORNEYS

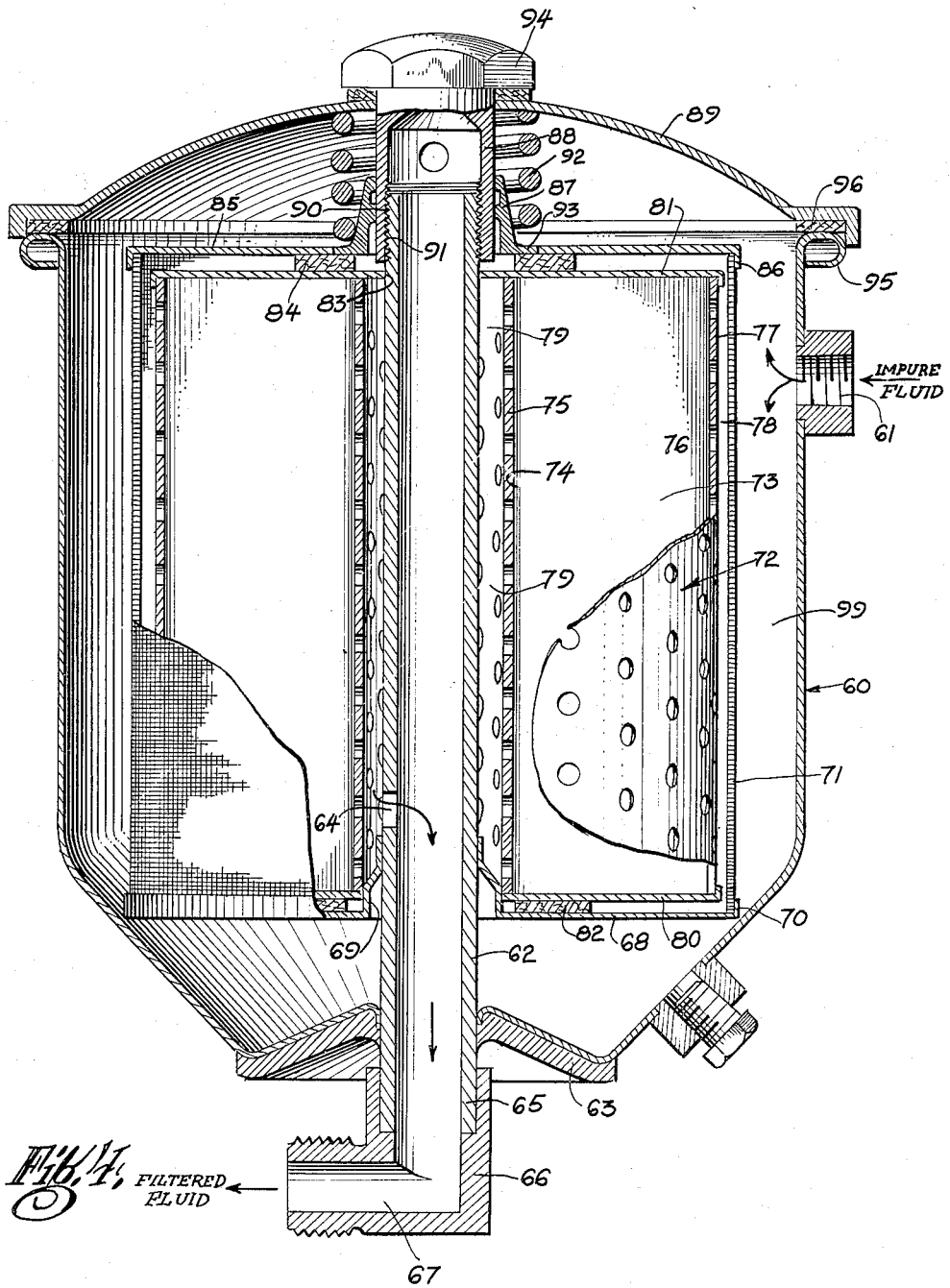

United States Patent Office 2,743,019
Patented Apr. 24, 1956

2,743,019

MULTIPLE STAGE FILTER

Julius P. Kovacs, Westfield, N. J., assignor to Purolator Products, Inc., Rahway, N. J., a corporation of Delaware Application August 28, 1953, Serial No. 377,129

6 Claims. (Cl. 210—184)

This invention relates to an improvement in filters, and, more particularly, to filters used in connection with mechanisms whose operation is dependent upon the use of hydraulic operating fluids.

In mechanisms of this type, for example, those involving operation of aircraft landing gear, aircraft cowl flaps and other aerodynamic surfaces, it is essential that the hydraulic operating fluid used in these mechanisms be carefully filtered to the finest extent of filtration possible in order to avoid mechanical failures of the mechanisms by reason of the presence of solid impurities. The avoidance of such mechanical failures is especially important in aircraft. For the fine degree of filtering necessary in order to keep the hydraulic fluid entirely free of solid impurities which might cause failure of the mechanism, it has been found that the fluid must be filtered through a pleated resin-impregnated cellulosic type of filter element such, for example, as the pleated filter element manufactured by Purolator Products, Inc., and described in U. S. Patent No. 2,642,187 to Bell, granted June 16, 1953. However, where the hydraulic fluid mechanism involved is used for one of the purposes above referred to, some of the solid impurities occurring in use of the mechanism have been found to be sharp slivers of metal. If the pleated impregnated filter element above mentioned is used alone in a filtering system using hydraulic fluid for the purposes mentioned, these slivers frequently puncture the filter element which is relatively fragile and as a result materially impair or destroy the fine filtering action of the element. Such destruction or impairment in consequence increases the hazards of mechanical failure of the mechanism.

In order to eliminate this difficulty and to obviate the puncturing hazards, this invention contemplates protective arrangements in the filter by way of the use of a metallic edge type filter element in conjunction with the pleated cellulosic type of filter element arranged in such a way with respect to the latter element that the fluid being filtered must first pass through the edge type metallic element before its passage through the cellulosic element. The metallic edge type element has filtering interstices that are small enough to trap the harmful metallic slivers and prevent their reaching the cellulosic element. This eliminates the hazards of puncturing the cellulosic element, and the latter is entirely free to perform its fine filtering function.

As an additional safety measure, the invention also contemplates the use of a second metal edge type element in the system so located relative to the cellulosic element through which the fluid has passed that it must also flow through the second edge type element. Thus, if by chance metallic slivers have actually gotten through the first-mentioned edge type metallic element and have punctured the cellulosic element, such slivers and those cellulosic particles torn from the cellulosic element as a result of its puncture, will be trapped and retained by the second edge type metallic filter element, and prevented from interfering with operation of the mechanism.

In practicing the invention, the metallic edge type filter elements which have tubular form are arranged concentrically relative to the cellulosic filter element which also has general overall tubular form so that one of the metallic edge type filter elements lies in spaced relationship relative to the outer surface of the pleated cellulosic filter element, and so that the second metallic edge type filter element lies in spaced relationship relative to the inner surface of the pleated cellulosic filter element. The three concentrically arranged filter elements in effect provide three step filtration through the filter in which they are arranged. This three stage filtration results in increased safety because more solid particles or impurities may be removed by passage of the hydraulic fluid through the three stages a fewer number of times than would be required if but a single filtration step were provided.

In practicing the invention the metallic edge type filter elements mentioned above may be frame-supported type elements such as are shown and described in Liddell Patent No. 2,042,537, or frameless self-supporting metallic edge type filter elements such as shown and described in Kovacs U. S. Patent No. 2,622,738, or they may be any other suitable type of metallic edge type filter element of the helically wound wire or disc type.

Any combination of metallic edge type filter elements of the type described may be used with the cellulosic type filter element to provide the composite multi-stage filter embodying the invention.

Objects and features of this invention are to provide a filter device that will be effective for use in hydraulic mechanisms of the type hereinabove described and which will adequately and efficiently filter the hydraulic fluid and remove all dangerous solid impurities that could cause impairment of function of the hydraulically operated mechanism.

Further objects and features of the invention are to provide filters utilizing multi-stage filtration whereby the hydraulically operated mechanism that is being served or operated by the filtered hydraulic fluid will be fully protected against the hazards of failure by reason of the pressure of impurities such as cellulosic fibers or metal slivers in the filtered fluid.

Further objects and features of the invention are the provision of filter structure providing multi-stage filtration that may be readily assembled and manufactured cheaply and in which clogged filter elements may be readily removed for cleaning or replacement.

Further objects and features of the invention will become apparent from the following specification and the accompanying drawings, wherein:

Fig. 4 is a view partially in vertical section of a modified filter also embodying the invention.

Figure 1:
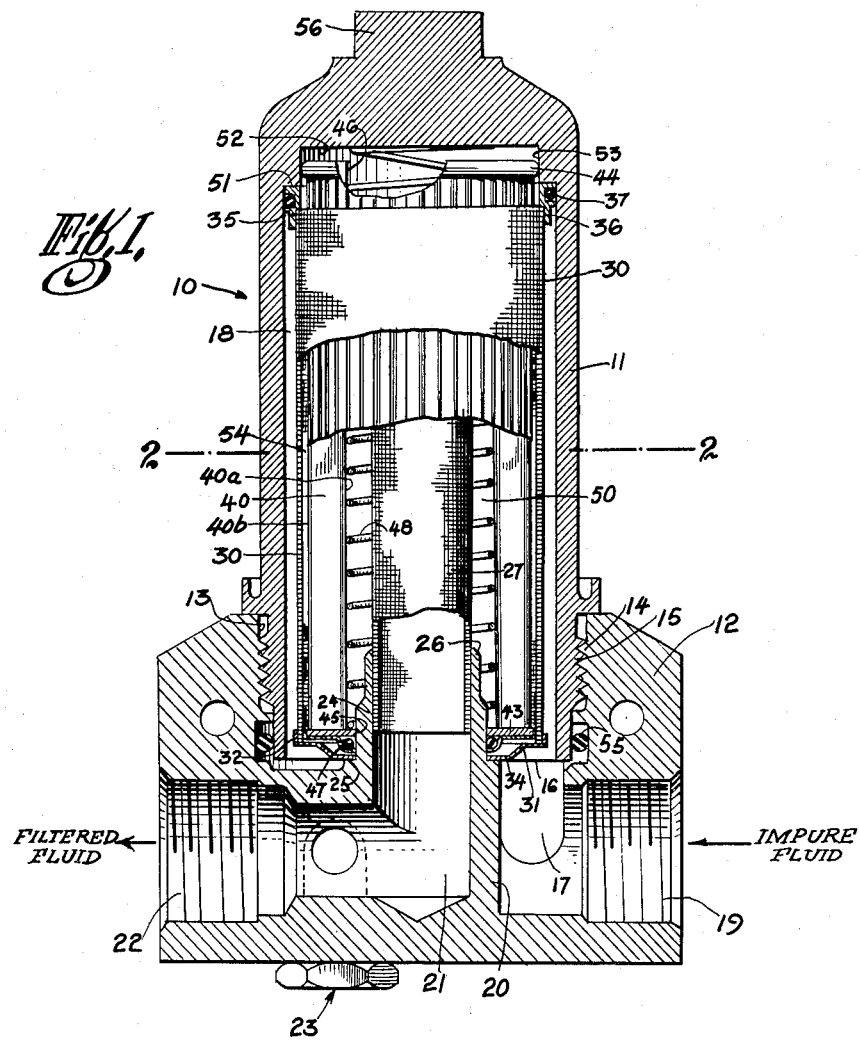
Fig. 1 is a view partially in vertical section of a filter embodying the invention.
Figure 2:
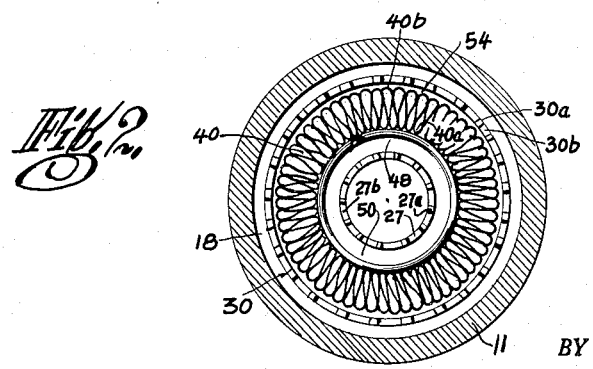
Fig. 2 is a transverse sectional view of the filter taken along line 2—2 of Fig. 1.
Figure 3:
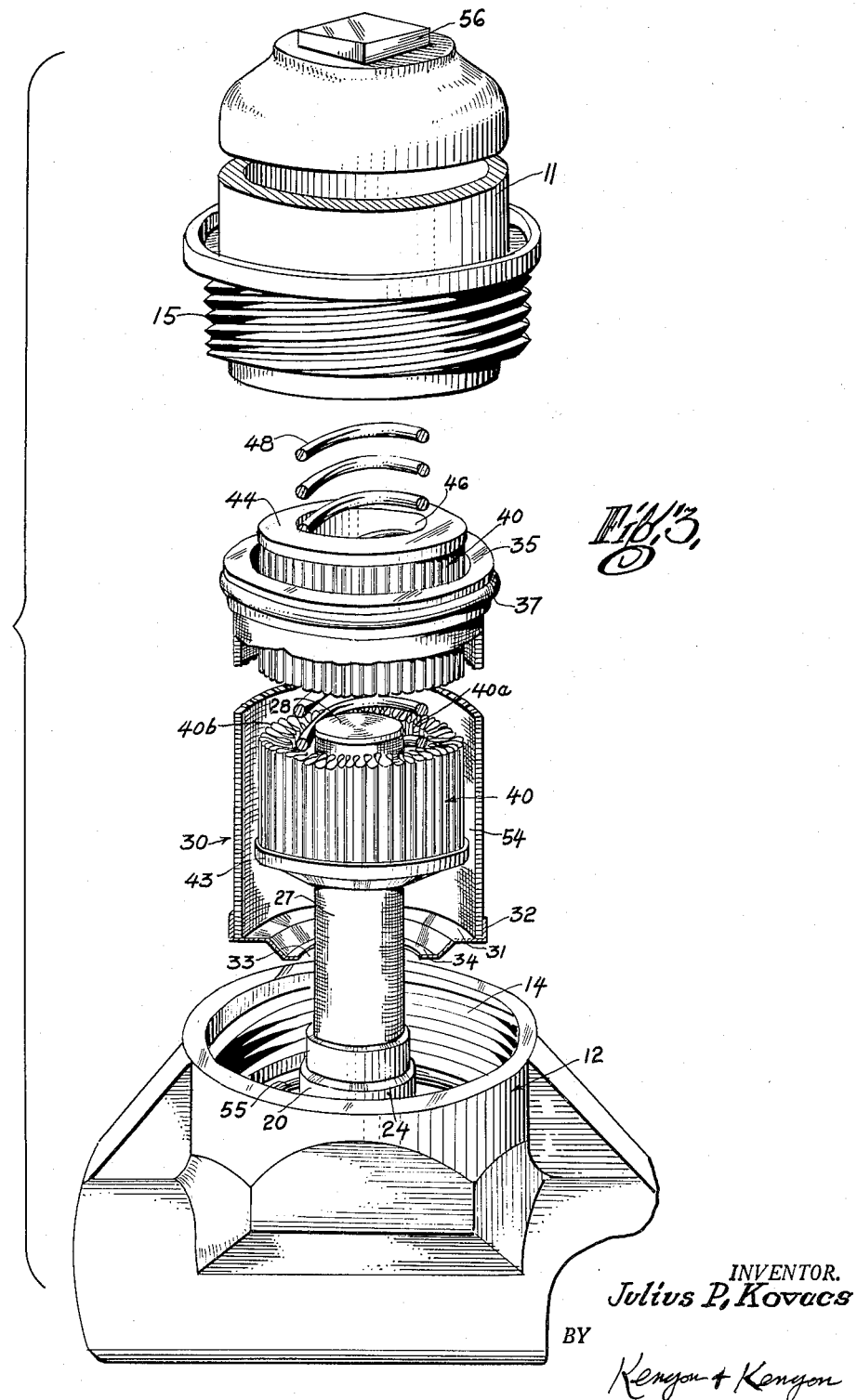
Fig. 3 is an exploded perspective view of the filter of Figs. 1 and 2.

Referring now to the drawings, and first to Figs. 1 to 3, inclusive, the reference character 10 denotes the filter or filter assembly as a whole. This filter 10 comprises a hollow body or casing 11 and a hollow base 12 with which the casing 11 is threadedly engaged as will be described. The body or casing 11 assembled with the base 12 constitutes a filter housing.

The base 12 has an open topped bore 13 that is internally threaded at 14 to receive the threaded portion 15 of the casing 11. The bore 13 extends downwardly in the base 12 below the lower open end 16 of the casing 11 to provide a chamber 17. This chamber 17 is in direct communication with the interior 18 of the casing 11 for purposes presently to be described. An inlet port or passageway 19 extending through a wall of the base 12 communicates directly with the chamber 17 and serves to admit fluid to be filtered to the filter 10.

A tubular member of center tube 20 which preferably is integral with the base 12 extends axially of the bore 13 and of chamber 17. Preferably this tubular member 20 is centrally located relative to the chamber 17 so that the latter is generally annular in shape. The bore 21 of the tubular member 20 defines a second chamber in the base 12 which is separated from the chamber 17 by the walls of said tubular member 20. An outlet passageway or port 22 is provided in a wall of the base 12 and communicates directly with the bore or chamber 21. The outlet port or passageway 22 provides for egress of filtered fluid from the filter 10 via the base 12 as will be presently described.

In the embodiment shown, the inlet port 19 and the outlet port 22 are axially aligned. Such alignment, however, is optional.

A relief valve assembly denoted generally by the reference character 23 is provided in the base 12. This relief valve assembly 23 which forms no part of the present invention is of any conventional type and serves to provide for direct relief flow of fluid from the inlet port 19 to the outlet port 22 in the event of clogged conditions of the filter elements in the filter 10.

The tubular member 20 has a portion 24 of reduced external diameter to provide an annular seat 25. The upper open end 26 of the tubular member 20 serves as a mount for a tubular metallic edge type filter element 27. This metallic edge type filter element in the embodiment shown is one made in accordance with the teachings of the aforesaid Kovacs Patent No. 2,622,738.

Such metallic edge type filter element 27 generally consists of a helically wound coil of flat thin metallic ribbon which has ribs or projections 27a (see Fig. 2) on one wide face of the ribbon and which projections serve to space the adjacent turns of the ribbon and define filtering interstices 27b between adjacent turns. As described in the aforesaid Kovacs patent, the ribs 27a are appropriately bonded to the smooth wide face of the adjacent ribbon turn so that the entire helix formed by the wound ribbon provides the tubular completely self-supporting metallic edge type filter element 27. The relative heights of the ribs 27a of the ribbon and the spacing between adjacent ribs determine the size of the filtering interstices.

The tubular self-supporting edge type metallic filter element 27 has one of its ends positioned in the upper end 26 of the tubular member 20 of base 12, as seen clearly in Fig. 1. The diameter of the filter element 27 is such that its end fits tightly in said portion 24 of the tubular member 20 and a force fit may be used to insure a tight connection. As seen clearly in Fig. 3, a cap 28 closes off the upper end of the metallic edge type filter element 27 and prevents flow of fluid to be filtered other than through the filtering interstices of said edge type metallic filter element 27.

A second metallic edge type filter element 30, whose construction is like that of filter element 27 but which is of considerably larger diameter, is provided. This second metallic edge type filter element 30 has ribs 30a and filtering interstices 30b. At its bottom end the filter element 30 has an end cap 31. This end cap 31 is secured to the bottom end of the filter element 30 as by an annular rim portion 32. This rim portion 32 may be welded or soldered in fixed relationship to said lower end of said element 30 in the position shown in Fig. 3. A centrally located opening 33 (see Fig. 3) is provided in a flange portion 34 of the end cap 31. The opening 33 is dimensioned to fit slidably on the reduced portion 24 of the tubular member 20 so that the flange portion 34 of the end cap 31 rests upon the seat 25. The end cap member 31 thus serves to support the tubular metallic edge type filter element 30 concentrically and in spaced relationship relative to the first-named tubular metallic edge type filter element 27.

An annular ring member 35 is secured adjacent the upper end of the second metallic edge type filter element 30, this member 35 being appropriately fastened or secured as by welding or soldering at 36 to said upper end of the filter element 30. An O-ring sealing member 37 is carried in an appropriate recess provided in the ring 35.

A resin-impregnated cellulosic pleated type filter element 40 is also carried removably on the tubular member 20, and as shown this cellulosic filter element 40 lies intermediate or between the two metallic edge type filter elements 27 and 30 and in concentric relationship thereto. In general, the pleated cellulosic filter element 40 comprises pleated phenol formaldehyde resin-impregnated cellulosic material, such as paper. This material, after pleating, is arranged in the form of a tubular annulus in which the inner folds 40a and outer folds 40b of the pleats extend substantially in the axial direction of the tubular annulus, and in which the walls of the plates are substantially radially arranged relative to the axis of said tubular annulus. The open ends of the pleats at the upper and lower ends of the pleatings in the annulus are sealed by respective end caps 43 and 44. The end caps 43 and 44 are appropriately secured to the end edges of the pleats as by cementing for example, as has been described in the aforesaid Bell Patent No. 2,642,187. The end caps 43 and 44 have axially aligned openings 45 and 46. The opening 45 is dimensioned so that end cap 43 will fit slidably on the reduced portion 24 of the tubular member 20 and rests upon an O-ring sealing member 47 which lies between the lower face of the end cap 43 and the upper face of the flange 34 of the end cap 31 of the tubular metallic edge type filter element 30. The opening 46 in end cap 44 is of sufficiently large dimensions to permit insertion into cellulosic filter element 40 of a coil spring 48 whose lower end rests upon the end cap 43. The coil turns of the spring 48 as shown in Fig. 1 lie in the space 50 between the outer surface of the inner metallic edge type filter element 27 and the inner fold edges 40a of the pleated cellulosic filter element 40.

The filter casing 11 has an inwardly projecting annular shoulder 51 which is so located that it will be tightened against the upper surface of annular ring 35 when the casing 11 is threaded into the base 12 thus serving to hold the tubular filter element 30 firmly against longitudinal or axial displacement on the tubular member 20. The upper end of the coil spring 48 abuts the inner surface 52 on the closed upper end of the casing 11, and when the casing 11 is tightened into its threaded engagement with the base 12 the spring 48 is compressed thus effecting a biasing action against the lower end cap 43 of the pleated cellulosic filter element 40, and thereby serving to prevent longitudinal displacement of said last-named element in the filter assembly 10.

The upper end cap 44 of the cellulosic filter element 40 fits into a reduced portion 53 of the casing 11 above the shoulder 51 and thus the cellulosic filter element 40 is centered at its upper end and maintained in its concentric relationship relative to the metallic edge type filter elements 27 and 30. The outer folds 40b of the pleats of filter element 40 then lie somewhat spaced from the inner surface of the metallic edge type filter element 30, the space being identified by the reference character 54.

The O-sealing ring 55 near the lower end of casing 11 prevents leakage of fluid entering the base 12 through the port 19 around the engaging threaded portions 14 and 15 of the base 12 and the casing 11. The upper end of the casing 11 is provided externally with a wrench engaging projection 56 to facilitate tightening of the casing 11 into the base 12.

The operation of the filtering assembly just described is as follows:

The three filter elements 27, 40 and 30 are mounted concentrically on the tubular member 20 of the base 12 as described, the spring 48 is inserted into the space 50 and the casing 11 is then slid over the assembled elements now carried by tubular member 20 and is tightened into threaded engagement with the base 12. Inlet port 19 is connected by a conduit (not shown) to the supply source of the impure hydraulic fluid that is to be filtered and the outlet port 22 is connected by a conduit (not shown) to effect delivery of filtered fluid from filter 10 for use in the hydraulic mechanism (not shown).

The impure fluid to be filtered which enters the port or passage 19 flows into the chamber 17 and thence into the portions of the chamber 18 of the casing 11 which are external to the outer surface of the metallic edge type filter element 30. Because of the sealing members 37 and 47, the fluid in said portions of chamber 18 can only flow through the interstices 30b of the metallic edge type filter element 30, and after emerging from the inner surface of said element 30 is distributed in the annular space 54 between the outer fold edges 40b of the pleated cellulosic filter element 40 and said inner surface of said metallic edge type element 30.

In the passage of the fluid through the interstices 30b of the metallic edge type element 30, any large solid impurities therein such as metal slivers are trapped and retained on the outer surface of said element 30 as the interstices 30b of the latter are small enough to preclude their passage with the fluid. Thus the fluid reaching the space 54 is free of such metallic slivers and other large impurities which could cause rupture and damage to the pleated cellulosic filter element 40. Because of end caps 43 and 44 which also act as sealing means, the fluid reaching the space 54 then flows through the pleated cellulosic filter element 40 into the space 50 between its inner fold edges 40a and the inner metallic edge type element 27. In its passage through the pleated cellulosic filter element 40 whose interstices are of microscopic size, very fine filtration is effected, ridding the fluid substantially of all those of its solid impurities which were not removed by the initial passage through the outer metallic edge type filter element 30. Because of end cap 28, the highly purified or filtered fluid in space 50 then is compelled to flow through the interstices 27b of the innermost metallic edge type filter element 27. The latter element 27 acts as a safety device primarily and the flow therethrough of the fluid of the space 50 rids such fluid of any metallic slivers that may have accidentally passed through the outer metallic element 30 and effected a partial rupture or puncture of the cellulosic element 40. Filter element 27 also traps any cellulosic fibers that may have been torn from the cellulosic element 40 by such rupture. The fluid after passing through the interstices of the inner metallic edge type element 27 passes downwardly into the bore or chamber 21 of the tubular member 20 and from there outwardly through the port or passage 22 of the base 12. The filtered fluid emerging from the port of passage 22 is entirely free of solid impurities that might be harmful in the hydraulic mechanisms (not shown) to which it is delivered from the port 22 for operational purposes.

It is to be noted that the passage of the fluid through the three concentrically arranged filter elements 30, 40 and 27 results in multi-stage filtration and that each stage accomplishes a specific purpose. The first stage is the passage through the outermost edge type metallic filter element 30 which rids the fluid of substantially all large harmful impurities including metal slivers, the second stage is the subsequent passage of the fluid through the fine filtering cellulosic filter element 40 which effectively rids the fluid of all remaining solid impurities that have not been trapped in the first stage of filtration, and the third stage of filtration is the passage subsequently of the fluid through the internally located metallic edge type element 27. In the latter stage any accidentally passed metallic slivers or cellulosic fibers torn from the cellulosic filter element 40 are trapped. With the construction shown, the presence of a protective edge type metallic filter element on each side of the cellulosic filter element 40 also permits reverse filtering action to be practiced with the filter assembly 10 simply by reversing the connections to the respective ports 19 and 22. In that event, the port 22 becomes the inlet port and the port 19 becomes the outlet port.

When the trapped impurities clog any of the three filter elements 27, 40 or 30, to such an extent that effective filtration is no longer possible, it is a simple matter to unscrew the casing 11 from its base 12 and remove all or any of the clogged elements either for cleansing or for replacement.

A modified form of filter assembly embodying the invention is shown in Fig. 4. In this embodiment, the reference character 60 denotes a generally cylindrical filter housing having an inlet port or passageway 61. A centrally located pipe 62 extends axially of the housing and outwardly thereof through its bottom 63. The tube or pipe 62 has one or more lateral passageways 64 for purposes presently to be described. The lower protruding end 65 of the pipe 62 is connected to a fitting 66 whose passageway 67 constitutes an outlet port that may be connected in any system to which filtered hydraulic fluid is to be supplied. A plate-like member 68 is fixedly supported from tube 62 by an annular sleeve 69 attached to said center tube 62 below the passageway 64. An annular upstanding flange 70 is provided at the outer peripheral edge of the plate 68. A metallic edge type filter element 71 of the same kind as hereinbefore described is carried by the plate 68. The outer diameter of the tubular edge type filter element 71 is such as to fit within the flange 70 of the plate 68 so that said flange acts as a centering guide for the lower end of the metallic edge type filter element 71.

A replaceable cellulosic type filter element 72 is removably supported concentrically of and internally of the metallic edge type filter element 71. The cellulosic filter element 72 is preferably of the type described in the aforementioned patent to Bell, and includes a pleated annulus 73 of phenol-formaldehyde, resin-impregnated cellulosic material, such as paper. This pleated annulus 73 is arranged with the folds of the pleats extending in the axial direction of the annulus and with the side walls of the pleats extending radially relative to the axis of the annulus.

The inner fold edges 74 of the pleats of annulus 73 abut a perforated tubular body 75 and the outer folds 76 of said pleats are enveloped by a perforated wrapping 77. The external diameter of the perforated wrapping 77 is somewhat smaller than the internal diameter of the metallic edge type element 71 to define the space 78 between the two. The inner perforated member 75 is of larger diameter than the center tube 62 to define the space 79 between the two. The opposite end openings of the pleats of annulus 73 are closed off by the respective end plates 80 and 81, which, as described in the aforesaid Bell patent, are appropriately cemented or otherwise secured in sealing relationship to the opposite end edges of the pleats.

The lower end cap 80 rests on a spacing and sealing member 82, which is supported by the plate 68. The lower portion of the cellulosic filter element 72 is centered with respect to the center tube 62 by interfitting of the tubular portion 69 that carries the plate 68 with the lower end of the tubular body 75. The upper portion of the cellulosic filter element 72 is centered relative to the center tube 62 by dimensioning the opening 83 in the end cap 81 to fit slidably on the outer circumference of the center tube 62.

A second spacing and sealing member 84 is provided on the upper outer surface of the upper end cap 81. A plate member 85 is adapted to rest upon the spacing and sealing member 84. This plate member 85 has the annular peripheral flange 86 which fits over the upper end of the metallic edge type element 71. The plate member 85 is carried by a slidable part 87. This part 87 fits slidably on the inwardly projecting portion of a tubular bolt 88 carried by the removable cover 89 of the housing 60. The tubular bolt 88 is internally threaded at 90 for threaded engagement with the threaded portion 91 at the upper end of the center tube 62. A spring 92 is positioned about the bolt 88 lying between the under or inner surface of the cover 89 and the flange 93 on the slidable part 87. With this arrangement when the bolt 88 is tightened by application of the wrench or other tightening tool to its headed end 94 the cover 89 is tightened into sealing relationship against the upper rim 95 of the housing 60 through the agency of a sealing gasket 96. At the same time, the spring 92 is compressed and this compression forces the slidable part 87 as well as the plate 85 toward the upper disc 81 of the cellulosic element 73. The biasing action of spring 92 prevents axial displacement of the cellulosic element 72 as well as the metallic edge type element 71. It also effects tight seals between the respective plates 68 and 85 and the respective end caps 80 and 81 through the agency of the spacing and sealing members 82 and 84.

The operation of this modification is as follows: The cover 89 is removed and first the metallic edge type element 71 mounted in supported relationship on the plate 68. The sealing member 82 is then placed on the plate 68. The replaceable cellulosic filter element 72 is then centered about the center tube 72 and lowered into place. The sealing member 84 is then deposited on the upper surface on the end cap 81. Plate 85 is then lowered into place with its flange 86 resting in the upper end of the metallic edge type element 71. The spring 92 is then mounted on the slidable part 87. The cover 89 is then put into place and the bolt 88 tightened to fix the components just described in the position shown in Fig. 4.

The inlet port 61 is then connected by a conduit (not shown) to a source of hydraulic fluid to be filtered. The outlet port 67 is connected by a conduit (now shown) for delivery of filtered fluid from the housing 60. The fluid to be filtered which enters the inlet port 61 distributes itself throughout the interior of the housing 60 in the space 99. From this space 99 the only way in which filtered fluid can reach the outlet port 67 during normal operation because of seal members 82 and 84 is by passage first through the interstices of the metallic edge type element 71 into the space 78 between its inner surface and the outer surface of the perforated wrapping 76 of the cellulosic filter element 72. In its passage through the interstices of the metallic edge type element 71, large solid impurities and metallic slivers are trapped because they cannot pass through interstices of such metallic edge type element. The partially filtered fluid reaching the space 78 is free, therefore, of such impurities as could cause rupture of the relatively fragile pleated element 73 of the cellulosic element 72. The partially filtered fluid in chamber 78 passes through the perforated wrapping 76 and through the walls of the pleated annulus 73 and thence through the perforated inner tubular element 75 into the space defined between the latter and the center tube 62. From said space 79, the filtered fluid which is substantially free of all harmful solid impurities and finely filtered by reason of its passage through the pleated cellulosic annulus 73 enters the center tube 62 via the port or passageway 64 and thence passes downwardly through the center tube and outwardly of the housing via the port or passageway 67 in the fitting 66. This emerging filtered fluid is then delivered by a conduit (now shown) for use in the hydraulic mechanism.

It is to be noted that here again multi-stage filtration is effected. The first stage of filtration is the passage of the fluid from the chamber 99 through the interstices of the metallic edge type element 71. The second stage of filtration occurs in the passage of the fluid from the chamber 78 through the pleated cellulosic filter element 72. In the first stage, the metallic slivers and other large impurities that might cause rupture of the cellulosic filter element 72 are blocked. In the second stage, the smaller sized impurities are blocked or trapped on the walls of the pleats of the cellulosic filter element 72. The blocking of the metallic slivers in the first stage of filtration provides a material protection for the cellulosic filter element 72 thus increasing the useful life of the latter, and also preventing likelihood of rupture and delivery of improperly filtered fluid for use in the hydraulic mechanisms.

As with the first modification, removal of the cover 89 permits cleansing of the two filter elements 71 and 72 or replacement if they are irreparably clogged.

If desired, with either of the modifications described, additional stages of filtration may be provided in a single housing by alternating a plurality of metallic edge type filter elements and cellulosic type filter elements in any concentric arrangement.

While specific embodiments of the invention have been disclosed and described herein, variations in structural details within the scope of the claims are possible and are contemplated. There is no intention, therefore, of limitation to the exact details shown and described.

What is claimed is:

1. A filter assembly for fluids comprising a generally cylindrical housing having inlet and outlet ports, a center tube within said housing communicating with said outlet port, a plurality of separate, individually insertable and replaceable tubular filter elements within said housing at least one of which is a pleated, resin-impregnated, cellulosic type of filter element and at least another of which is a metallic edge type filter element, means for mounting said elements concentrically about said center tube, and means for directing the fluid to be filtered that enters the housing via said inlet port to pass successively through all of the filter elements and then into said center tube before emerging in filtered condition from the outlet port of said housing.

2. A filter assembly for fluids comprising a hollow casing and a base removably joined together, said base having a chamber and an inlet port communicating therewith, a center tube in said base defining a second chamber separated from the first-named chamber, said base having an outlet port communicating with said second chamber, a plurality of separate, individually insertable and replaceable, concentrically arranged filter elements carried by said center tube and extending into said casing, at least one of said filter elements being an edge type of filter element and at least one of said filter elements being a pleated, resin-impregnated, cellulosic type of filter element, said filter elements being arranged on said center tube so that fluid to be filtered entering said inlet port is compelled to flow in succession through all of said filter elements and then into said center tube before emerging from said outlet port in filtered condition.

3. A filter assembly for fluids comprising a hollow casing and a base removably joined together, said base having an annular chamber and an inlet port communicating therewith, a center tube in said base defining a second chamber separated from said first-named chamber, said base having an outlet port communicating with said center tube, a tubular edge type filter element having one end fitted into said center tube and extending upwardly therefrom into said casing, a tubular, resin-impregnated, cellulosic type filter element concentrically surrounding said first-named filter element in spaced relationship thereto and being carried by said center tube, a second tubular edge type filter element concentrically surrounding said resin-impregnated filter element in spaced relationship thereto, said elements being separate and individually insertable and replaceable and means for directing flow of fluid to be filtered that enters said inlet port successively through all of the filter elements before its emergence in filtered condition from said outlet port.

4. A filter assembly for fluids comprising a housing and a base, said housing being removably attached to said base, said base having an inlet port and an outlet port, a center tube in said base communicating with one of said ports, a plurality of separate, individually replaceable and insertable, concentrically arranged filter elements spaced from each other within the housing, with the innermost thereof fitted into said center tube and being of the edge type, the next of said concentrically arranged filter elements being of the resin-impregnated cellulosic type and the next of said concentrically arranged elements being of the edge type, said last two named filter elements being supported from said center tube, seal means in conjunction with said elements for compelling flow of fluid to be filtered that enters said inlet port to pass successively through all of said filter elements and then into said center tube prior to emergence of the fluid in filtered condition via said outlet port, and means including a spring for maintaining the filter elements in their concentrically arranged positions.

5. A filter assembly for fluids comprising a housing having inlet and outlet ports, a center tube in said housing communicating with one of said ports, a tubularly shaped, edge type filter element having one end fitted into said center tube, a tubularly shaped, pleated, resin-impregnated, cellulosic type filter element mounted about said center tube in concentric spaced relationship thereto, a tubularly shaped, edge type element mounted about said center tube in concentric spaced relationship relative to said cellulosic type filter element, said elements being separate and individually insertable and replaceable in the assembly, end members for each of said filter elements, and sealing means in conjunction with said end members arranged so that fluid to be filtered entering said housing via its inlet port must pass successively through said filter elements before emerging in filtered condition via said outlet port, the said filter elements being disposed so that flow of all fluid to be filtered is first through an edge type filter element, then through the cellulosic type filter element and thereafter through another edge type filter element.

6. A filter assembly for fluids comprising a housing having inlet and outlet ports, a center tube in said housing communicating with one of said ports, a tubularly shaped, pleated, resin-impregnated, cellulosic type filter element mounted about said center tube in concentric spaced relationship thereto, a tubularly shaped, edge type element mounted about said center tube in concentric spaced relationship relative to said first-named filter element, said elements being separate and individually insertable and replaceable in the assembly, end members for each of said filter elements, sealing means between said end members arranged so that fluid to be filtered entering said housing via its inlet port must pass successively through said filter elements before emerging in filtered condition via said outlet port, the said two filter elements being disposed so that flow of fluid to be filtered is first through the edge type filter element and then through the cellulosic type filter element, and spring means for maintaining the filter elements in their mounted positions.

References Cited in the file of this patent

UNITED STATES PATENTS

| | | |
|---|---|---|
| 1,937,415 | Sydney | Nov. 28, 1933 |
| 2,218,800 | Williams | Oct. 22, 1940 |
| 2,220,706 | Cantin | Nov. 5, 1940 |
| 2,271,054 | Williams | Jan. 27, 1942 |
| 2,320,725 | Hauzenroeder | June 1, 1943 |
| 2,354,380 | Kasten | July 25, 1944 |
| 2,471,069 | Le Clair | May 24, 1949 |
| 2,627,350 | Wicks | Feb. 3, 1953 |
| 2,667,271 | Turskey | Jan. 26, 1954 |

FOREIGN PATENTS

| | | |
|---|---|---|
| 681,379 | Great Britain | Oct. 22, 1952 |